US010926952B1

(12) United States Patent
Shi et al.

(10) Patent No.: US 10,926,952 B1
(45) Date of Patent: Feb. 23, 2021

(54) OPTIMIZING STORAGE SPACE UTILIZING ARTIFICIAL INTELLIGENCE

(71) Applicant: Amazon Technologies, Inc., Seattle, WA (US)

(72) Inventors: Jane Shi, Tewksbury, MA (US); Clark Zhang, Philadelphia, PA (US)

(73) Assignee: Amazon Technologies, Inc., Seattle, WA (US)

( * ) Notice: Subject to any disclaimer, the term of this patent is extended or adjusted under 35 U.S.C. 154(b) by 184 days.

(21) Appl. No.: 16/197,820

(22) Filed: Nov. 21, 2018

(51) Int. Cl.
| | |
|---|---|
| *G06F 7/00* | (2006.01) |
| *B65G 1/137* | (2006.01) |
| *G06Q 50/28* | (2012.01) |
| *G06N 3/08* | (2006.01) |

(52) U.S. Cl.
CPC .............. *B65G 1/1373* (2013.01); *G06N 3/08* (2013.01); *G06Q 50/28* (2013.01)

(58) Field of Classification Search
CPC ......... B65G 1/1373; G06Q 50/28; G06N 3/08
USPC ........................ 700/213–215, 217–218, 228
See application file for complete search history.

(56) References Cited

U.S. PATENT DOCUMENTS

| | | | |
|---|---|---|---|
| 2018/0060764 A1* | 3/2018 | Hance | G06Q 50/28 |
| 2018/0068255 A1* | 3/2018 | Hance | G06Q 10/087 |
| 2019/0016543 A1* | 1/2019 | Turpin | B25J 19/023 |

OTHER PUBLICATIONS

Sermanet, et al., "Time-Contrastive Networks: Self-Supervised Learning from Video", Mar. 20, 2018, 15 pages.
Pathak, et al. "Zero-Shot Visual Imitation", 2018. 16 pages, UC Berkeley.
Sermanet, et al. "Time-Contrastive Networks: Self-Supervised Learning from Multi-View Observation", Apr. 23, 2017, 14 pages.

* cited by examiner

*Primary Examiner* — Yolanda R Cumbess
(74) *Attorney, Agent, or Firm* — Kilpatrick Townsend & Stockton LLP

(57) ABSTRACT

Techniques for identifying optimal placement instructions for placing an object within a container by a robotic device are disclosed. An artificial intelligence model may be trained utilizing historical placement images and/or placement data to identify subsequent placement instructions for a robotic device. As an object is brought within a threshold distance of a goal placement location, one or more images may be captured of an area adjacent to the placement location. Features of these images may be provided to the artificial intelligence model as input to cause the artificial intelligence model to identify particular placement instructions for the robotic device. By executing the identified placement instructions, the available space within the storage container may be optimized (e.g., increased) by reducing the space between objects of the storage container in accordance with the placement instructions.

20 Claims, 7 Drawing Sheets

US 10,926,952 B1

OPTIMIZING STORAGE SPACE UTILIZING ARTIFICIAL INTELLIGENCE

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

Additionally, in high-capacity inventory systems (e.g., inventory systems that manage thousands of items per day), there is a need to optimize the storage of inventory items in order to better utilize the storage space available. To better utilize available storage space, the operator of a high-capacity inventory system may need to optimize gross cubic utilization (GCU) (e.g., the amount of space actually occupied by items while in storage). In inventory systems that utilize robotic system components for item storage and retrieval, items maintained in the inventory system are often stored in a way that does not optimize GCU (e.g., there is significant space between the items).

BRIEF DESCRIPTION OF THE DRAWINGS

Various embodiments in accordance with the present disclosure will be described with reference to the drawings, in which.

DETAILED DESCRIPTION

Figure 1:
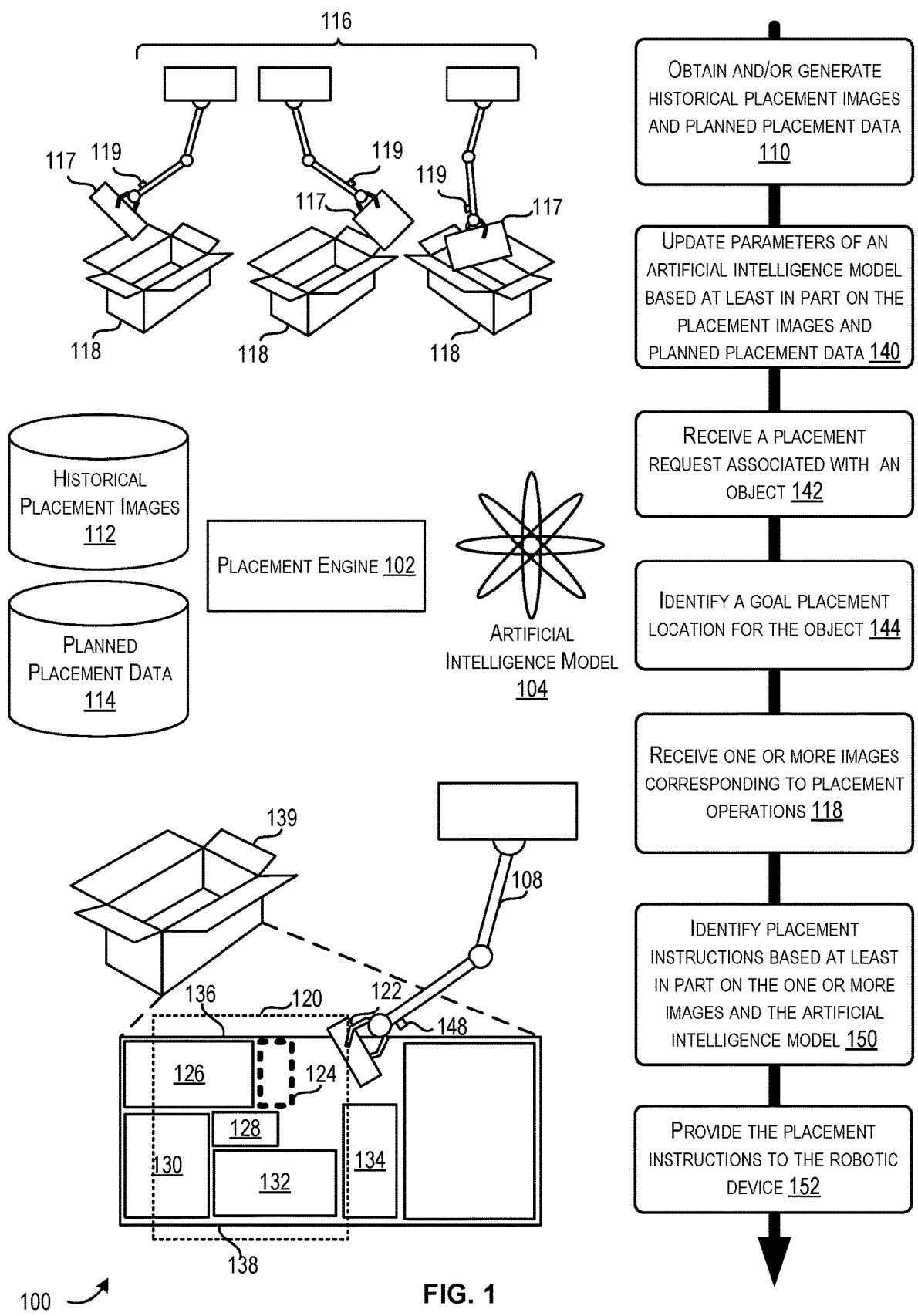
FIG. 1 illustrates an example method for identifying placement instructions utilizing an artificial intelligence model, the placement instructions enabling an item to be optimally placed within a storage container by a robotic device, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a placement engine for determining an optimized placement for an item based at least in part on an artificial intelligence model. In some embodiments, the artificial intelligence model may be trained to identify placement instructions for a robotic device (e.g., a robotic arm configured with an end effector) that may be utilized to place an item in an optimal position within a storage container (e.g., a bin, a shelf, a tray, a box, etc.). As used herein, "an optimal position" or references to "optimized placement" may refer to item placement that minimizes space between the placed item and at least one other item and/or container edge. An "item" may include any physical object. "Placement instructions" as used herein may describe any suitable executable instructions for causing a robotic device to move in any suitable manner to place an item within a storage container.

By way of example, in some inventory systems, items may be placed within storage containers utilizing robotic devices. One example robotic device may include a robotic arm assembly that includes a grasping mechanism with which items may be picked up in order to store items at, or retrieve items from, a storage container. Any suitable robotic device for conveying items to/from a storage container may be utilized. Each robotic device may be configured with an image capture device (e.g., a camera). In some embodiments, the image capture device may be situated in the general area of the storage container (e.g., overhead, attached to a structure within some proximity of the storage container and/or robot, etc.) without necessarily being attached to a robotic device. As an item is brought within a threshold distance of a specified storage location within the storage container, an image may be captured by an image capture device situated on the robotic device. The image may depict an area adjacent (e.g., within a threshold distance) of the specified storage location (e.g., a goal location for storing the item). In some embodiments, the image may include the item to be placed, one or more previously placed items within the storage container, and/or one or more portions of the storage container itself. The image may be provided to a previously trained artificial intelligence model (e.g., a neural network, etc.). The artificial intelligence model may be previously trained to identify placement instructions based at least in part on the features of an input image and/or features of planned placement data such as the specified storage location for the item. Accordingly, based at least in part on these input features (e.g., the position of one or more previously placed items, the specified storage location of the item, the visible portion(s) of the storage container itself, or any suitable combination of the above), the artificial intelligence model may identify specific placement instructions for the robotic device. These placement instructions may be executed by the robotic device to place the item near the specified storage location, while at the same time, minimizing the space between the item being placed and the one or more previously placed items and/or boundaries of the storage container.

In some embodiments, the artificial intelligence model may include one or more neural networks. A neural network may utilize machine-learning techniques to learn inherent features of a set of training images in order to identify placement instructions that optimize (e.g., reduce) the amount of space between objects (e.g., items in a storage container). In some embodiments, the artificial intelligence model may be trained utilizing training data that includes any suitable number of historical placement images. As a non-limiting example, images captured from past item placement may be utilized, although in some embodiments, training data may be generated. By way of example, a robotic device may place an item at a randomly selected goal location. Once placed, the robotic device may be instructed to move the item some distance away from the goal location. An image may be captured once the item has been moved. Accordingly, the image may be utilized as training data, together with the goal location and corresponding placement instructions (e.g., the reverse of the operations conducted to move the item away from the optimal location), in order to train the artificial intelligence model to identify placement instructions based at least in part on input images. In some embodiments, additional training images may be generated by modifying the goal location (e.g., randomly perturbing the goal location) to simulate an object being place slightly off the ideal goal position (e.g., such as when a closest previously placed item is not aligned with the goal location). The position and/or orientation of the perturbed goal location (and placement instructions corresponding to the modified goal location) may further be utilized for training data for the artificial intelligence model. Any suitable number of training images may be generated utilizing the techniques discussed herein. The training may utilize supervised learning techniques. In supervised learning, the training data may be labeled (e.g., good placement, bad placement, optimal placement, and/or more details such as good placement and space measurement between placed items, etc.). The training labels may be utilized as ground truth during training.

The embodiments of the present disclosure may provide many technological benefits over existing systems. Generally, existing systems may place object (e.g., items) blindly at a storage location without factoring in the surrounding environment (e.g., previously placed objects that may have shifted, etc.). Accordingly, conventional object placement may result in a non-optimal storage placement that introduces unnecessary space between objects. This may result in fewer objects being placed within a storage container and wasted space within the inventory system as a whole.

In contrast, the embodiments of the present disclosure provide an automated process that can optimize (e.g., reduce) the space between objects in a storage container to more efficiently utilize storage space within the environment. In particular, the training data may include a large and diverse set of images with corresponding goal locations and placement instructions. The artificial intelligence model may include one or more neural networks. For example, one neural network may be trained to learn inherent features of an input image (e.g., storage container edges, previously placed items within the storage container, etc.) and another neural network may be trained to learn inherent features associated with the goal location. Features of the image may be utilized together with features of the goal location in order to identify placement instructions for placing the object (e.g., at least overlapping the goal location but aligned with at least one previously placed item) utilizing a previously trained artificial intelligence model. In addition, a loss function may be defined based on an optimization of available space within the storage container after placement of the item. This loss function may be utilized to adjust the parameters of the artificial intelligence model to penalize placement instructions that result in sub-optimal placement within a storage container. Accordingly, over time, the artificial intelligence model may be modified to increase the accuracy of optimal placement identifications over time.

In the interest of clarity of explanation, the embodiments of the present disclosure are described in connection with inventory systems. However, it should be appreciated that the same or similar techniques as described herein may be utilized in any suitable system in which physical items are to be placed near other items and an optimized storage approach is desirable.

FIG. 1 illustrates an example method 100 for identifying (e.g., by a placement engine 102) placement instructions utilizing an artificial intelligence model 104. In some embodiments, the placement instructions may enable an item to be optimally placed within a storage container 139 by the robotic device 108, according to an embodiment of the present disclosure. In an example, the method may begin at 110 where historical placement images 112 and planned placement data 114 may be obtained and/or generated.

By way of example, in some embodiments, one or more robotic devices (e.g., robotic devices 116) may be utilized to generate training data for the artificial intelligence model 104. The robotic device 108 may be an example of the robotic devices 116. In some embodiments, the robotic device 116 may include one or more robotic arms configured to convey objects 117 (e.g., store and/or retrieve items from storage containers 118) although any suitable robotic device configured to convey object may be utilized. The objects 117 and the storage containers 118 are intended to be illustrative in nature and not necessary to scale. Any suitable object and/or storage container (e.g., a bin, a tray, a shelf, a box, etc.) may be similarly utilized. In some embodiments, the robotic devices 116 may each be configured with an image capture device (e.g., one or more cameras such as cameras 119) angled to capture an image of a placement area (e.g., a threshold distance around a specified placement location. By way of example, area of an image 120 is depicted as captured by robotic device 108 during placement operations for object 122. Within an image, a goal location (e.g., goal location 124), some portion of one or more previously placed objects (e.g., previously placed objects 126-134), and/or at least one boundary of the storage container (e.g., edges 136 and edges 138 of storage container 139) may be depicted, or any suitable combination of the above. A software and/or hardware module of the robotic devices 116 may be configured to cause an image to be captured by the cameras 119 upon any suitable triggering event (e.g., when the object to be placed is determined to be within a threshold distance of a goal location, etc.). Although FIG. 1 depicts the image capture devices (e.g., cameras 119) being situated on the robotic devices 116, it should be appreciated that in other embodiments, the image capture devices may be differently situated on, or near, the robotic devices. In some embodiments, the image capture devices (e.g., the cameras 119) may be in communication with the robotic devices 116 and/or the placement engine 102 such that the images captured by the image capture devices are accessible to components of the robotic devices 116 and/or the placement engine 102.

In some embodiments, robotic devices 116 may be utilized to obtain and/or generate historical placement images 112 and/or planned placement data 114 (e.g., goal locations) to be utilized as training data for the artificial intelligence model 104. By way of example, the robotic devices 116 may place objects (e.g., the objects 117) at randomly selected goal locations. Once placed, the robotic devices 116 may be instructed to move the objects 117 some distance away from the goal location. An image may be captured once the object 117 has been moved.

In some embodiments, the artificial intelligence model 104 may include one or more neural networks that may be individually trained to identify the features of the historical placement images 112 (e.g., the boundaries of previously placed objects adjacent to the goal location, edges/boundaries of the storage container, etc.) and/or the planned placement data 114 (e.g., a goal location and/or coordinates of a goal location, orientation of the goal location with respect to the previously placed objects, dimensions of the goal location, etc.). In some embodiments, a neural network may be trained to identify the features of the historical placement images 112, while another neural network may be trained to identify the features of the planned placement data 114. In other embodiments, a single neural network may be trained to identify the features of both the historical placement images 112 as well as the planned placement data 114.

At 140, parameters of the artificial intelligence model 104 may be updated (e.g., by the placement engine 102) based at least in part on the features of the historical placement images 112 and/or the planned placement data 114. Said another way, the historical placement images 112 may be utilized as training data, together with corresponding placement instructions (e.g., the reverse of the operations conducted to move the item away from the optimal location), in order to train the artificial intelligence model 104 to identify placement instructions based at least in part on input images. In some embodiments, the planned placement data 114, which may include a goal location, may additionally be utilized as training data to identify placement instructions. In some embodiments, the planned placement data 114 may include randomly perturbed goal locations that simulate objects being place slightly off the ideal goal position (e.g., such as when a closest previously placed item is not aligned with the goal location). The position and/or orientation of the perturbed goal location (and placement instructions corresponding to the modified goal location) may further be utilized for training data for the artificial intelligence model 104. One or more neural networks of the artificial intelligence model 104 may be trained to extract the features of the historical placement images 112 and/or the planned placement data 114. These features may be utilized to train the artificial intelligence model 104 to identify placement instructions given a set of input features extracted from the historical placement images 112 and/or the planned placement data 114.

At 142, a placement request associated with an object may be received (e.g., from the robotic device 108). In response to the placement request, a goal placement location for the object may be identified at 144. The goal placement location may be identified in any suitable manner as part of an inventory system. In some embodiments, the goal placement location may be identified by a management module of the inventory system that may be configured to identify task assignments for the robotic devices 116 (including the robotic device 108) within the system. Any suitable algorithm for identifying available space within a storage container for a particular object to be placed is contemplated. Once identified, the goal placement location (and/or corresponding instructions) may be communicated to the robotic device 108 via any suitable electronic communications protocol. Upon receipt of the goal placement location/instructions, the robotic device 108 may be configured to perform operations to bring the object 122 within a threshold distance of the goal location 124.

At 146, one or more images (e.g., the image 120) corresponding to placement operations may be received (e.g., by the placement engine 102). The placement engine 102 may be configured to utilize the artificial intelligence model 104. In some embodiments, the robotic devices 116 may be configured with a software and/or hardware module that determines that the object is within a threshold distance of the goal location. Based at least in part on this determination, the image capture device (e.g., the image capture device 148) may be stimulated to capture an image (e.g., the image 120).

At 150, placement instructions may be identified based at least in part on the image 120 and the artificial intelligence model 104. In some embodiments, the placement engine 102 may be configured to input the image 120 and/or any suitable planned placement data (e.g., a goal location of the object 122) to the artificial intelligence model 104. The artificial intelligence model 104 may identify features of the image 120 and/or the goal location 124. In some embodiments, the artificial intelligence model 104 may include one or more neural networks that have been trained to identify the features of the image 120 (e.g., the boundaries of previously placed objects 126-134, edges 136 and/or 138, etc.) and/or the goal location 124 (e.g., orientation of the goal location 124 with respect to the previously placed objects 126-134, dimensions of the goal location 124, etc.).

At 152, the placement instructions may be provided (e.g., by the placement engine 102) to the robotic device 108. In some embodiments, receiving the placement instructions may cause the robotic device 108 to execute the instructions to place the object 122 within the storage container 139 according to the placement instructions.

Figure 2:
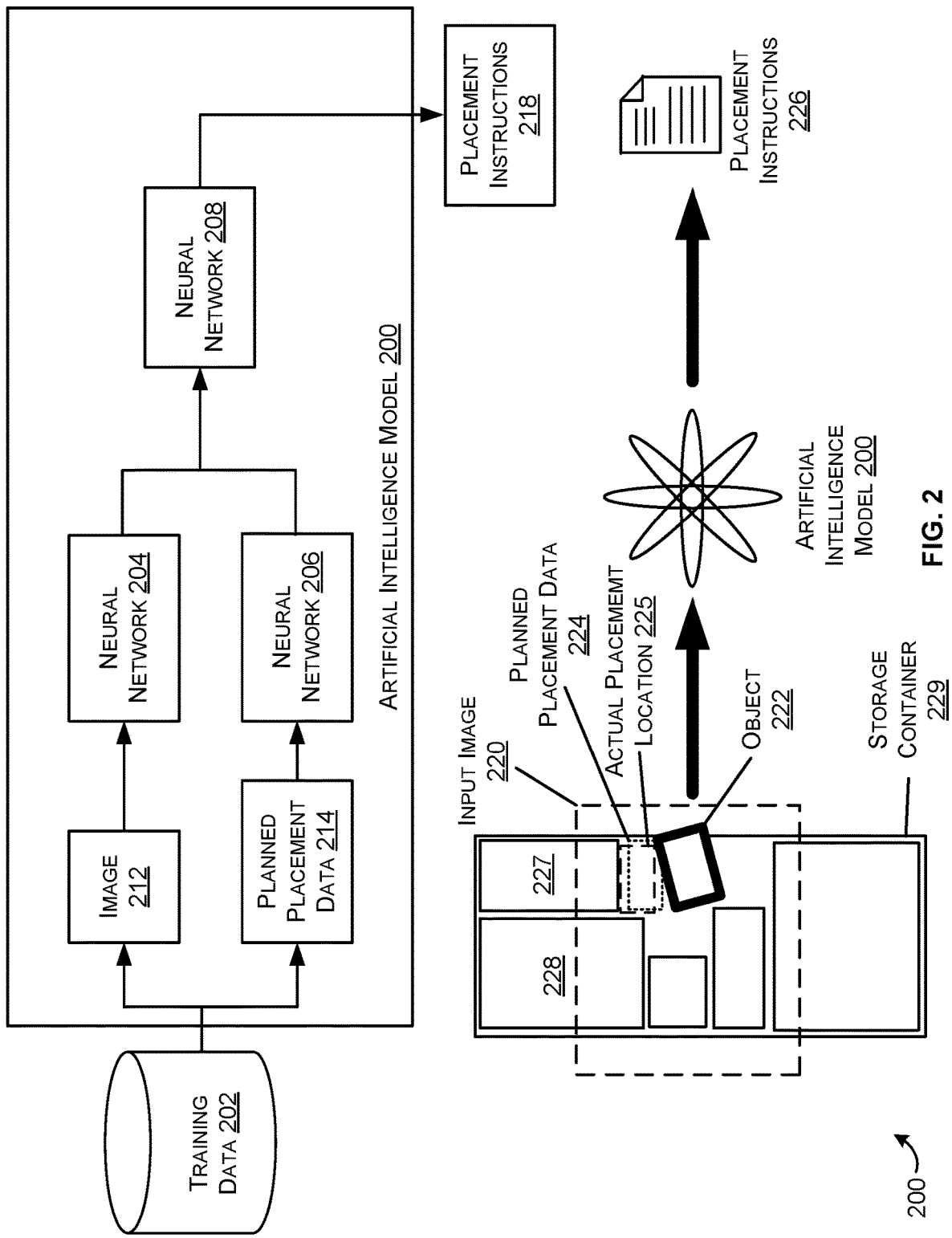
FIG. 2 illustrates an example computing environment for training an artificial intelligence model, according to an embodiment of the present disclosure.

FIG. 2 illustrates an example computing environment for training an artificial intelligence model 200, according to an embodiment of the present disclosure. The artificial intelligence model 200 may correspond to the artificial intelligence model 104 of FIG. 1. The training of the artificial intelligence model 200 may rely on training data 202. In some embodiments, training data 202 may include the historical placement images 112 and corresponding instances of the planned placement data 114 of FIG. 1.

In some embodiments, the artificial intelligence model 200 may include a neural network 204, a neural network 206, and a neural network 208. In some embodiments, the neural network 204 may be trained (or previously trained) to identify one or more features (e.g., portions of an object to be placed, one or more previously placed object boundaries, one or more edges/boundaries of a storage container in which the object is to be placed, etc.) of an input image (e.g., the image 212 obtained from the training data 202). Similarly, in some embodiments, the neural network 206 may be trained (or previously trained) to identify one or more features (e.g., dimensions of a goal location, orientation of a goal location within a storage container, orientation of the goal location with respect to one or more previously placed object boundaries, etc.) of the planned placement data 214 (e.g., obtained from the training data 202 and corresponding to the image 212). In some embodiments, the planned placement data 214 includes at least the goal location for the object being placed and a set of known placement instructions. The training data 202 may include any suitable number of images and corresponding planned placement data (including known placement instructions) for any suitable number of training placement instances.

In some embodiments, the neural network 208 may be configured to take as input, the output (e.g., the identified features) as provided by the neural networks 204 and 206. It should be appreciated that in some embodiments, the functionality of the neural networks 204 and 206 may be provided by a single neural network and/or by the neural network 208 as part of the analysis it provides. In some embodiments, the neural network 208 may be trained to learn relationships between the features of the image 212 (and images of the training data 202), the features of the planned placement data 214 (and planned placement data of the training data 202), and the set of (already known) placement instructions for placing an object corresponding to the image 212. As discussed herein, the planned placement data 214 may include the set of already known placement instructions for placing the object. In some embodiments, parameters of the neural network 208 may be modified during this training stage based at least in part on these learned relationships. The placement instructions 218 may be identified as output of the neural network 208.

Once trained, the artificial intelligence model 200 may be utilized in the manner discussed above in connection with FIG. 1. For example, an input image 220 may be obtained by an image capture device of a robotic device (or accessible to a robotic device such as robotic device 108 of FIG. 1). In some embodiments, the input image 220 may include at least a portion of the object 222. The planned placement data 224 may correspond to at least the goal location for the object 222 as depicted in FIG. 2. The input image 220 and the planned placement data 224 corresponding to the input image 220 may be provided to the artificial intelligence model 200. The artificial intelligence model 200 may identify placement instructions 226 in the manner discussed above. Placement instructions 226, once executed, may result in the object 222 being placed at an actual placement location 225 as depicted in FIG. 2. Actual placement location 225 may be located nearer to one or more other adjacent objects (e.g., object 227 and 228) within the storage location (e.g., the storage container 229) than the goal location as indicated by the planned placement data 224. In short, by extracting various features of the input image 220 and the planned placement data 224 and analyzing those features within the trained model to identify the placement instructions 226. These placement instructions 226 may be selected based at least in part on optimizing (e.g., minimizing) an overall distance/spacing between the object 222 and one or more objects adjacent to the goal/actual placement location and/or optimizing (e.g., maximizing) an amount of available space left in the storage location (e.g., the storage container 229).

It should be appreciated that the process described herein for identifying placement instructions may be performed any suitable number of times. That is, it is not necessarily the case that a single image and planned placement data be utilized to identify a single set of placement instructions. Rather, it may be the case that an object is incrementally placed closer and closer to a goal location utilizing multiple images captured during placement operations. In some embodiments, an image may be captured and planned placement data utilized to identify a set of instructions that move the object closer to the goal location. Another image may be captured once the object is moved according to the first set of instructions and the new image and planned placement data utilized to identify a subsequent set of instructions. This process may be performed any suitable number of times. In some embodiments, this process may be performed until it is determined that the object has been placed within a threshold distance of one or more edges of the storage container and/or one or more previously placed objects within the storage container.

Figure 3:
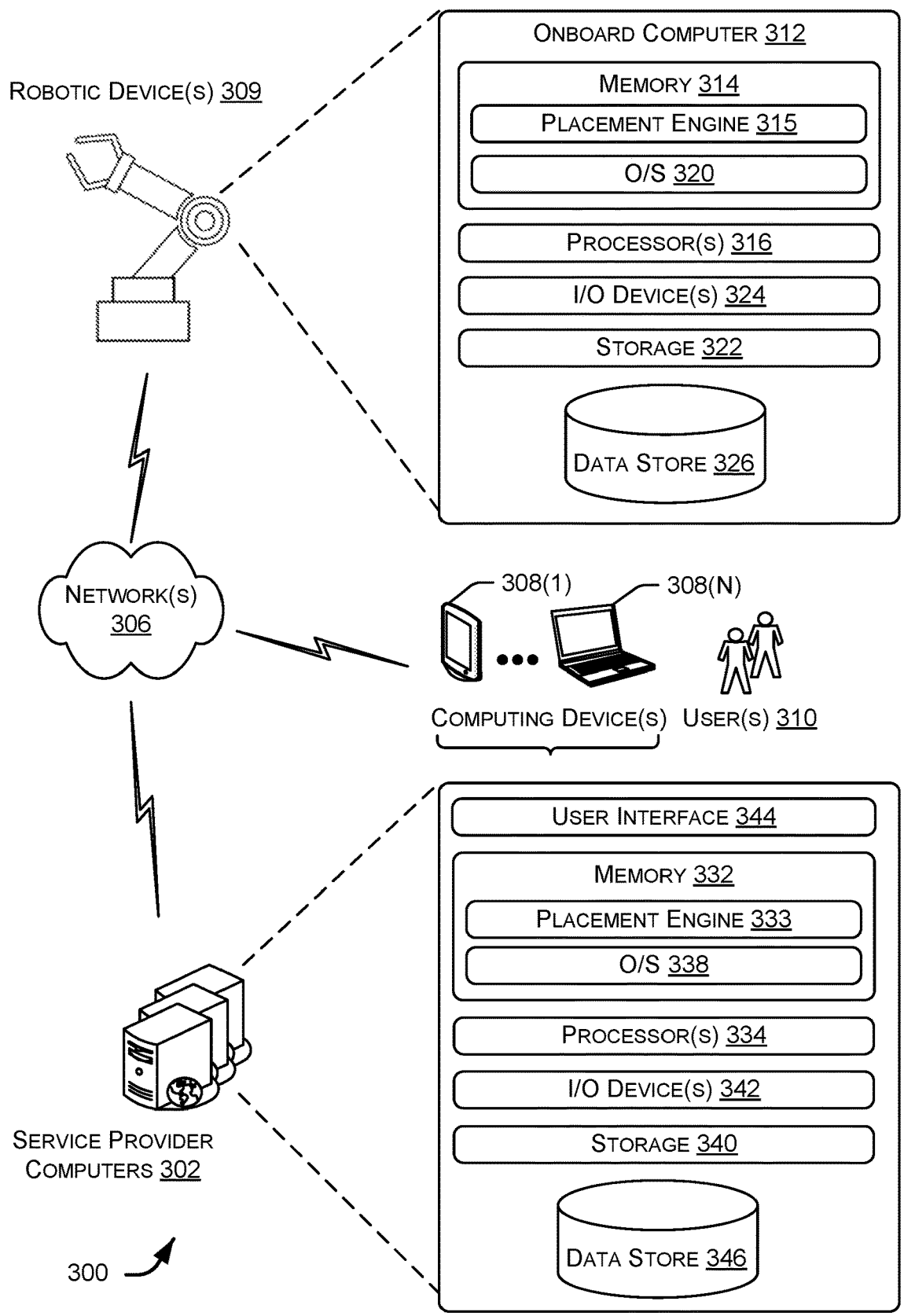
FIG. 3 is an example system architecture for implementing aspects of the inventory system, in accordance with at least one embodiment.

FIG. 3 is an example system architecture 300 for implementing aspect of the inventory system, in accordance with at least one embodiment. The architecture 300 may include a service provider computers 302. The service provider computers 302 may support an inventory system of an electronic marketplace that may interface with purchase and delivery services of the electronic marketplace. In some embodiments, the service provider computers 302 may coordinate receiving, storing, packaging, and shipping of items in a warehouse operated by, or on behalf of, an electronic marketplace provider. In some examples, the service provider computers 302 may be a stand-alone service operated on its own or in connection with an electronic marketplace. In either example, the service provider computers 302 may be in communication with the robotic devices 309 (e.g., the robotic devices 116 of FIG. 1) via one or more network(s) 306 (hereinafter, "the network 306"). The network 306 may include any one or a combination of many different types of networks, such as cable networks, the Internet, wireless networks, cellular networks, radio networks, and other private and/or public networks.

Computing devices 308(1)-308(N) may also be in communication with the service provider computers 302 via the network 306. The computing device 308 may be operable by one or more users 310 (hereinafter, "the users 310") to access the service provider computers 302 via the network 306. The computing devices 308 may be any suitable device (e.g., portable or non-portable) capable of communicating with the network 306. For example, the computing devices 308 may be any suitable computing device such as, but not limited to, a mobile phone, a smart phone, a personal digital assistant (PDA), a laptop computer, a thin-client device, a tablet PC, a desktop computer, a scanner, or other computing device. The computing device 308 may include one or more processors, memory, I/O devices, one or more data stores, additional storage, an operating system, and the like.

Turning now to the details of the robotic device 309. The robotic device 309 may be examples of the robotic devices 116 of FIG. 1. In some embodiments, the robotic device 309 may include an onboard computer 312 including at least one memory 314 and one or more processing units (or processor(s)) 316. The processor(s) 316 may be implemented as appropriate in hardware, computer-executable instructions, software, firmware, or combinations thereof. Computer-executable instruction, software or firmware implementations of the processor(s) 316 may include computer-executable or machine-executable instructions written in any suitable programming language to perform the various functions described. The memory 314 may include more than one memory and may be distributed throughout the onboard computer 312. The memory 314 may store program instructions (e.g. including the placement engine 315, an example of the placement engine 102 of FIG. 1) that are loadable and executable on the processor(s) 316, as well as data generated during the execution of these programs.

Depending on the configuration and type of memory including the placement engine 315, the memory 314 may be volatile (such as random access memory (RAM)) and/or non-volatile (such as read-only memory (ROM), flash memory, or other memory). The memory 314 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM. Turning to the contents of the memory 314 in more detail, the memory 314 may include an operating system 320 and one or more application programs, modules or services for implementing the features disclosed herein including at least the placement engine 315.

In some examples, the onboard computer may also include additional storage 322, which may include removable storage and/or non-removable storage. The additional storage 322 may include, but is not limited to, magnetic storage, optical disks, and/or tape storage. The disk drives and their associated computer-readable media may provide non-volatile storage of computer-readable instructions, data structures, program modules, and other data for the computing devices.

The memory 314 and the additional storage 322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 312. The modules of the onboard computer 312 may include one or more components. The onboard computer 312 may also include input/output (I/O) device(s) 324 and/or ports, such as for enabling connection with a keyboard, a mouse, a pen, a voice input device, a touch input device, a display, speakers, a printer, or other I/O device. The I/O device(s) 324 may enable communication with the other systems of the robotic devices 309.

The onboard computer 312 may also include data store 326. The data store 326 may include one or more databases, data structures, or the like for storing and/or retaining information associated with the robotic devices 309 such as any suitable data related to task assignments, instructions, and/or task performance information.

The service provider computers 302, perhaps arranged in a cluster of servers or as a server farm, may host web service applications. These servers may be configured to host a website (or combination of websites) viewable via the computing devices 308. In at least one example, the service provider computers 302 may be configured to manage the robotic devices 309 as part of an inventory system. The service provider computers 302 may include at least one memory 332 and one or more processing units (or processor(s)) 334. The processor(s) 334 may be implemented as appropriate in hardware, computer-executable instructions, software, firmware, or combinations thereof. Computer-executable instruction, software, or firmware implementations of the processor(s) 334 may include computer-executable or machine-executable instructions written in any suitable programming language to perform the various functions described.

The memory 332 may include more than one memory and may be distributed throughout the service provider computers 302. The memory 332 may store program instructions (e.g., placement engine 333, an example of the placement engine 102 of FIG. 1) that are loadable and executable on the processor(s) 334, as well as data generated during the execution of these programs. Depending on the configuration and type of memory including the placement engine 333, the memory 332 may be volatile (such as random access memory (RAM)) and/or non-volatile (such as read-only memory (ROM), flash memory, or other memory). The service provider computers 302 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 332 may include multiple different types of memory, such as static random access memory (SRAM), dynamic random access memory (DRAM), or ROM.

Turning to the contents of the memory 332 in more detail, the memory 332 may include an operating system 338 and one or more application programs, modules or services for implementing the features disclosed herein including at least the placement engine 333. The placement engine 333, in some examples, may function similarly to the placement engine 315 with respect to identifying placement instructions for the robotic devices 309. For example, when the robotic devices 309 are in network communication with the service provider computers 302, the robotic devices 309 may receive at least some instructions from the service provider computers 302 via the placement engine 333 executed by the processors 334. In some examples, the robotic devices 309 may individually execute the placement engine 315 to operate independent of the service provider computers 302.

In some examples, the service provider computers 302 may also include additional storage 340, which may include removable storage and/or non-removable storage. The additional storage 340 may include, but is not limited to, magnetic storage, optical disks, and/or tape storage. The disk drives and their associated computer-readable media may provide non-volatile storage of computer-readable instructions, data structures, program modules, and other data for the computing devices.

The memory 332 and the additional storage 340, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 302. The modules of the service provider computers 302 may include one or more components. The service provider computers 302 may also include input/output (I/O) device(s) 342 and/or ports, such as for enabling connection with a keyboard, a mouse, a pen, a voice input device, a touch input device, a display, speakers, a printer, or other I/O device.

In some examples, the service provider computers 302 may include a user interface 344. The user interface 344 may be utilized by an operator, or other authorized user, to access portions of the service provider computers 302. In some examples, the user interface 344 may include a graphical user interface, web-based applications, programmatic interfaces such as application programming interfaces (APIs), or other user interface configurations. The service provider computers 302 may also include data store 346. The data store 346 may include one or more databases, data structures, or the like for storing and/or retaining information associated with the service provider computers 302.

In at least one embodiment, the placement engine 315 and/or the placement engine 333 may provide the functionality of the placement engine 102 of FIG. 1 from a robotic device or server centric viewpoint, respectively.

Figure 4:
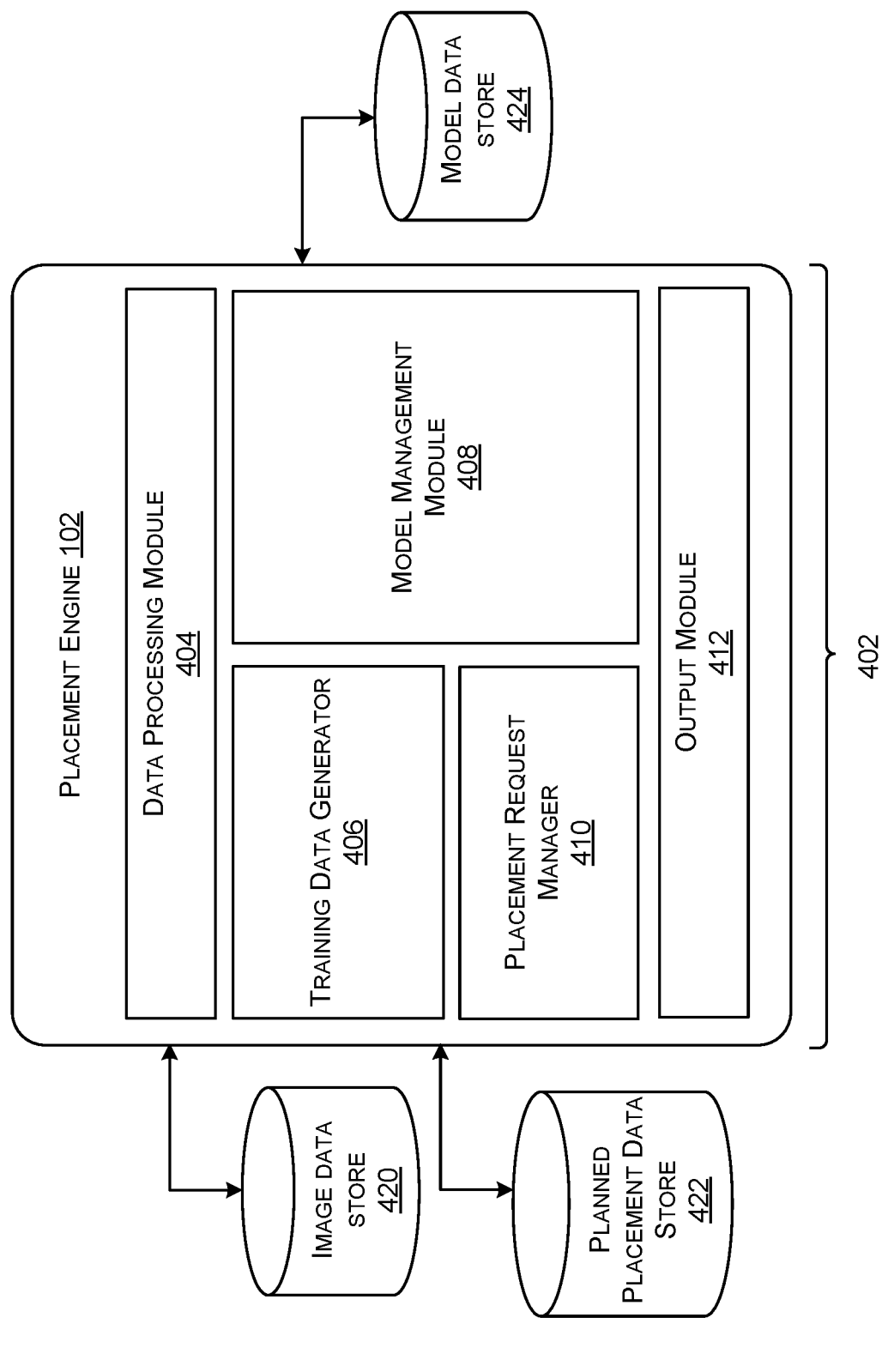
FIG. 4 illustrates in greater detail the components of an example placement engine that may be utilized in at least one embodiment.

FIG. 4 illustrates in greater detail the components of an example placement engine (e.g., the placement engine 102) that may be utilized in at least one embodiment. The placement engines 315 and/or 333 of FIG. 3 may provide the functionality described in connection with the placement engine 102. As shown, the example embodiment includes modules 402. The modules 402 may be any suitable software and/or hardware modules. In the embodiments shown in FIG. 4, the modules 402 include a data processing module 404, a training data generator 406, a model management module 408, a placement request manager 410, and an output module 412. As discussed above, the placement engine 102 may represent a single component, multiple components located at a central location within an inventory system, or multiple components distributed throughout an inventory system. For example, placement engine 102 may represent components of one or more robotic devices (e.g., the robotic devices 309 of FIG. 3) and/or components of the service provider computers 302 of FIG. 3. In the embodiment depicted in FIG. 3, the placement engine 102 may be in communication with image data store 420 and placement data store 422. In some embodiments, the image data store 420 and the placement data store 422 may be provided together. That is, images and placement data may be stored in a combined storage location in some embodiments.

As depicted in FIG. 4, the placement engine 102 includes the data processing module 404. In general, the data processing module 404 may be configured to receive any suitable data from any suitable source. By way of example, in some embodiments, the data processing module 404 may receive training data comprising one or more images and/or one or more instances of placement data corresponding to the one or more images. In some embodiments, the data processing module 404 may be configured to store received images in the image data store 420. The data processing module 404 may be further configured to store received placement data within the placement data store 422. In some embodiments, the data processing module 404 may be configured to associate the stored placement data with the corresponding image. In still further embodiments, the data processing module 404 may be configured to store the images together with their corresponding placement data within a single data store (not shown). In some embodiments, the images received and stored within the image data store 420 may include any suitable number of historical placement images (e.g., the historical placement images 112 of FIG. 1). The planned placement data (e.g., a goal location, a set of known and/or previously attempted placement instructions, etc.) received may include any suitable number of instances, which may individually correspond with a historical placement image.

In some embodiments, the placement engine 102 may include a training data generator 406. In some embodiments, the training data generator 406 may be configured to instruct one or more robotic devices to generate training data to be utilized to train an artificial intelligence model (e.g., the artificial intelligence model 200 of FIG. 2). In some embodiments, the training data generator 406 may be configured to identify a robotic device (or more than one robotic device) and an object to be placed (or more than one object to be placed). Utilizing the robotic device and the object, the training data generator 406 may cause training data to be generated.

By way of example, the training data generator 406 may provide instructions to the robotic device to place an item at a selected goal location within a particular storage container accessible to the robotic device. Once placed, the training data generator 406 may instruct the robotic device move the item some distance away from the goal location. The training data generator 406 may be configured to cause an image may be captured. The image may be captured by an image capture device (e.g., an example of the cameras 119 of FIG. 1) accessible to the robotic device once the item has been moved. The image may be obtained by the training data generator 406 and stored within the image data store 420. The selected goal location and the corresponding placement instructions (e.g., the reverse of the operations conducted to move the item away from the selected goal location) may be stored within the planned placement data store 422. In some embodiments, additional training data may be generated by the training data generator 406 by modifying the goal location (e.g., randomly perturbing the goal location) to simulate an object being place slightly off the ideal goal position (e.g., such as when a closest previously placed item is not aligned with the goal location). The position and/or orientation of the perturbed goal location (and placement instructions corresponding to the modified goal location) may be stored within the planned placement data store 422. It should be appreciated that the training data generator 406 may be utilized to generate any suitable number of training images utilizing the techniques discussed herein.

The placement engine 102 may further include a model management module 408. The model management module 408 may be configured to train an artificial intelligence model (e.g., the artificial intelligence model 200 of FIG. 2) according to the techniques described herein. By way of example, the model management module 408 may be configured to train and/or obtain one or more neural networks. In some embodiments, these neural networks may be previously trained (e.g., by the model management module 408 or another suitable component included in or separate from the placement engine 102). In some embodiments, one of these neural networks may be trained (or previously trained) to identify one or more features (e.g., portions of an object to be placed, one or more previously placed object boundaries, one or more edges/boundaries of a storage container in which the object is to be placed, etc.) of an input image. Another neural network may be trained (or previously trained) to identify one or more features (e.g., dimensions of a goal location, orientation of a goal location within a storage container, orientation of the goal location with respect to one or more previously placed object boundaries, etc.) from planned placement data. As discussed above, a single neural network (or other artificial intelligence model) may be utilized to identify features of an image as well as features of planned placement data. In some embodiments, these one or more neural networks (referred to as "feature networks") may be stored within the model data store 424, a data store configured to store such information.

In some embodiments, model management module 408 may be configured provide images from the image data store 420 to a feature network obtained from the model data store 424. Similarly, the model management module 408 may be configured to provide planned placement data from the planned placement data store 422 to another (or the same) feature network obtained from the model data store. In some embodiments, the model management module 408 may receive as output of the neural networks, a set of image features for each image, and as set of feature for each planned placement data corresponding to each image. Utilizing the output features of these one or more neural networks, the model management module 408 may be configured to train another artificial intelligence model (e.g., a neural network corresponding to the artificial intelligence model 200 of FIG. 200). In some embodiments, model management module 408 may be configured to train the artificial intelligence model to learn relationships between the features identified for the input image(s) and the features corresponding to the input planned placement data. As discussed herein, the planned placement data may include the set of already known placement instructions for placing the object. In some embodiments, the model management module 408 may be configured to adjust parameters of the artificial intelligence model during this training stage based at least in part on these learned relationships. In this manner, the model management module 408 may be configured to train the artificial intelligence model to identify placement instructions as output based at least in part on the sets of features provided as input. In some embodiments, once trained, the artificial intelligence model may be stored in the model data store 424 for subsequent use.

In some embodiments, the placement engine 102 includes a placement request manager 410. The placement request manager 410 may be configured to receive placement requests from any suitable number of robotic devices. In some embodiments, the placement request may include a planned placement location (e.g., a goal location corresponding to a particular storage container). In some embodiments, the placement request may include one or more attributes of the storage container. Although in other embodiments, the placement request manager 410 may be configured to obtain one or more attributes of the storage container from a data store and/or system (not depicted) configured to store such information. In some embodiments, the placement request manager 410 may stimulate capture of and/or receive one or more images captured during placement operations associated with an object. As discussed herein, the image may include some portion of the object to the be placed, one or more previously placed objects within the storage location, one or more boundaries of the storage location, or any suitable combination of the above. In some embodiments, the placement request manager 410 may be configured to stimulate an image capture device associated with the robotic device requesting placement instructions to obtain one or more images. In other embodiments, the robotic device may be configured with software and/or hardware modules that may stimulate an image capture device of the robotic device to capture one or more images. By way of example, a software and/or hardware module of the robotic device may cause a camera (e.g., one of the I/O devices 324 of FIG. 3) to capture an image including an area surrounding a goal location for an object when the software/hardware module detects that the object is within a threshold distance (e.g., a predetermined distance such as five millimeters, 4 inches, etc.) from the goal location.

Upon obtaining one or more images during placement operations, the placement request manager 410 may provide the obtained image(s) and the corresponding planned placement data to the model management module 408. Upon receipt, the model management module 408 may be configured to input the image and corresponding planned placement data to the previously trained artificial intelligence model stored in the model data store 424. The artificial intelligence model may provide output corresponding to a set of identified placement instructions. The identified placement instructions may comprise one or more operations to be performed by the robotic device to place the object at an optimal location. In some embodiments, the optimal location may not be the exact same location as indicated by the goal location. By way of example, given other previously placed objects within the storage container, it may be the case that the optimal location for the object is partially overlapping the goal location and/or aligned with at least one of the previously placed items within the storage location.

In some embodiments, the model management module 408 may provide the identified placement instructions to the output module 412 (either directly, or via the placement request manager 410). In some embodiments, the output module 412 may execute any suitable conversion techniques as necessary to convert the identified placement instructions into instructions that are executable by the robotic device. Although in some embodiments, the identified placement instructions may need no conversion, it may be the case that in some systems, a variety of robotic devices may be utilized such that the executable instructions for each robotic device need not necessarily be the same or follow the same protocol. Accordingly, the output module 412 may be configured to perform any suitable conversions prior to sending the identified placement instructions to the requesting robotic device. Upon receipt, the robotic device may be configured to execute the placement instructions to place the object according to the placement instructions.

In some embodiments, the output module 412 (or any suitable component of the placement engine 102) may be further configured to cause an image capture device (e.g., an image capture device situated on or accessible to a robotic device) to capture an image of the object as placed. In other embodiments, an image capture device may be configured to capture an image when stimulated by a robotic device (e.g., upon a determination that the object has been placed). In some embodiments, this additional image may be stored within the image data store 420. In still further embodiments, the model management module 408 may be configured to infer placement of the object within the image based at least in part on the identified placement instructions. Utilizing the additional image and/or the inferred placement of the object, the model management module 408 may be utilized to adjust various parameters of the artificial intelligence model. By way of example, the model management module 408 may be configured to implement the described loss function in order to access the value of the actual placement of the object (or the inferred placement of the object). Given a set of predetermined criteria, the model management module 408 may calculate a value corresponding to an accuracy of the placement with respect to optimally reducing space between the placed object and one or more previously placed objects and/or one or more edges of the storage container. When the calculated value indicates that the actual/inferred placement resulted in an optimally placed object, the model management module 408 may be configured to adjust the parameters of the artificial intelligence model to prefer the chosen set of placement instructions given the corresponding features of the image and planned placement data. Conversely, when the calculated value indicates that the actual/inferred placement resulted in a sub-optimally placed object, the model management module 408 may be configured to adjust the parameters of the artificial intelligence model to exclude and/or penalize the chosen set of placement instructions given the corresponding features of the image and planned placement data.

Figure 5:
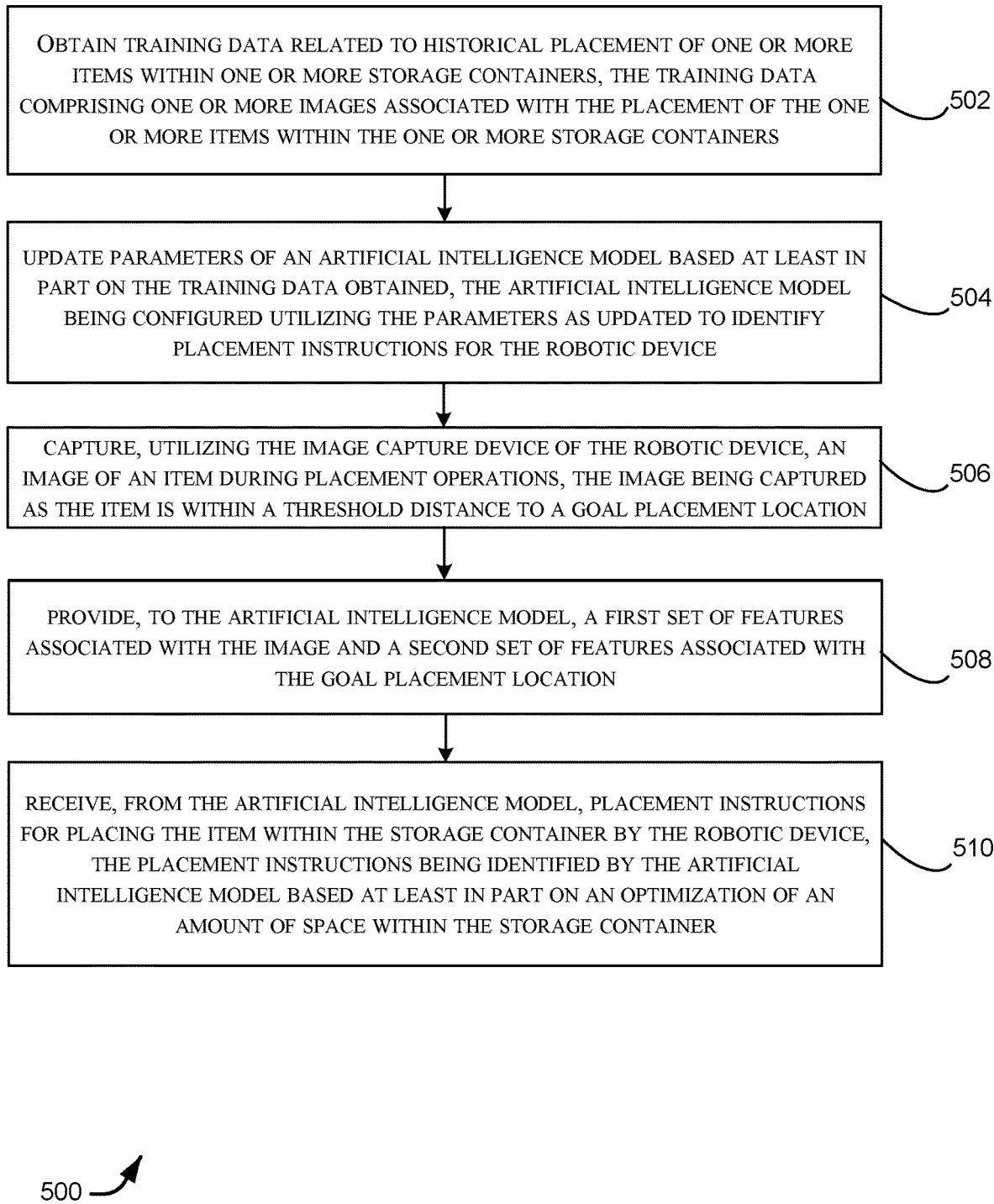
FIG. 5 is a flowchart illustrating an example method for identifying placement instructions utilizing an artificial intelligence model, in accordance with at least one embodiment.
Figure 6:
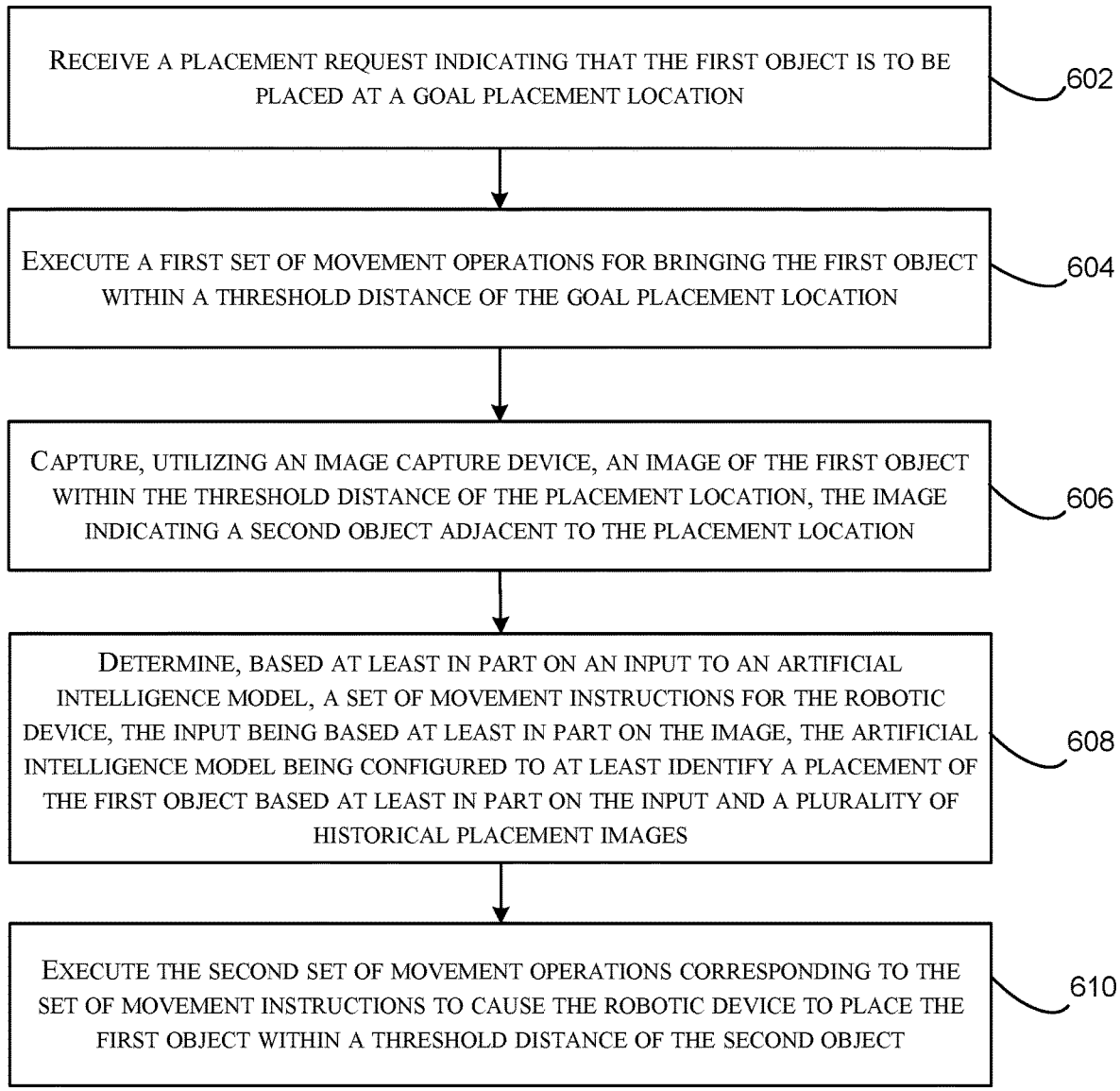
FIG. 6 is a flowchart illustrating another example method for identifying placement instructions utilizing an artificial intelligence model, in accordance with at least one embodiment.
Figure 7:
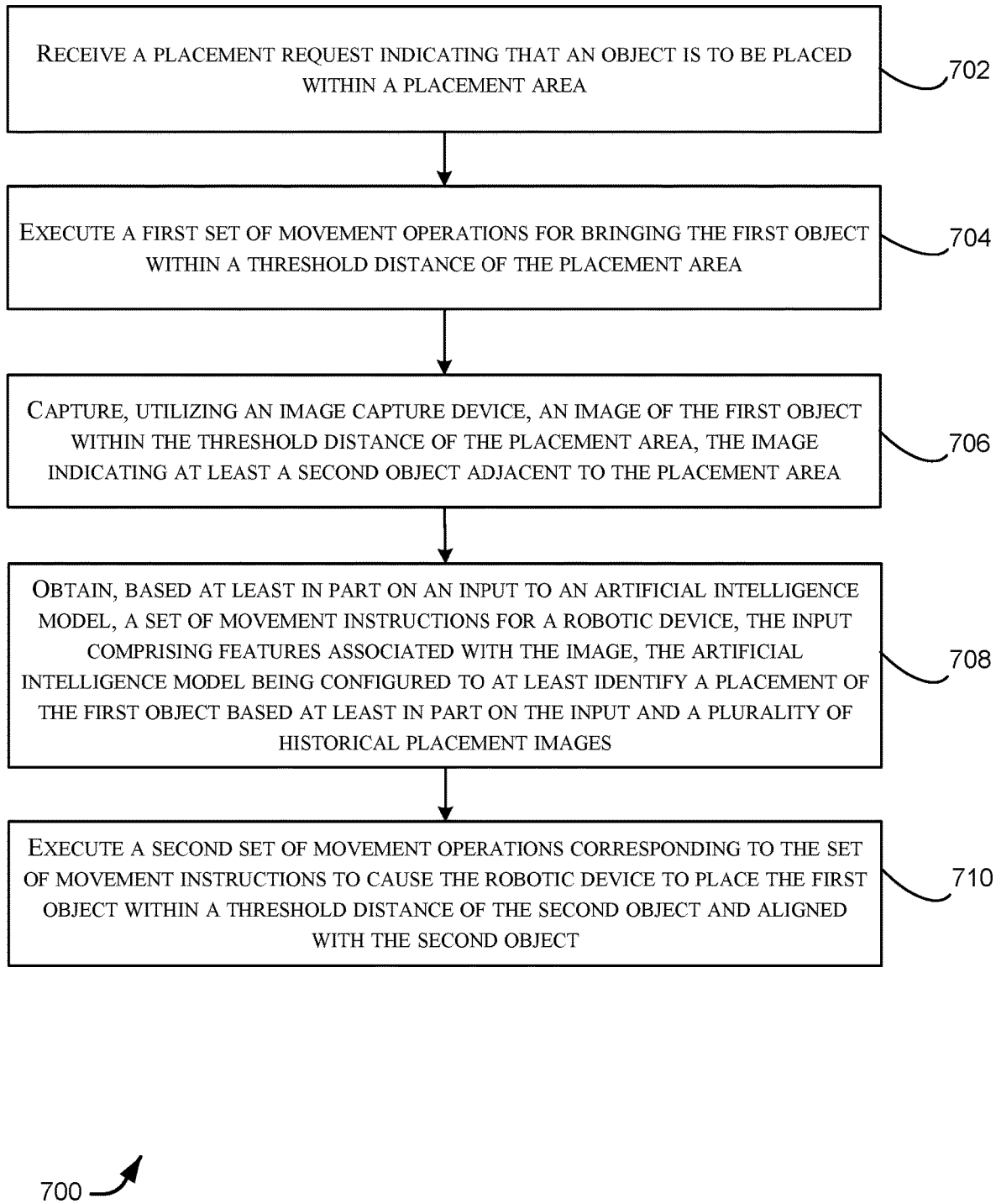
FIG. 7 is a flowchart illustrating still one further example method for identifying placement instructions utilizing an artificial intelligence model, in accordance with at least one embodiment 1, in accordance with at least one embodiment.

FIGS. 5-7 illustrate example flows for identifying various placement instructions, according embodiments of the present disclosure. Instructions for performing the operations of the flows can be stored as computer-readable instructions on a non-transitory computer-readable medium of a computer system, such as the placement engine 102 described herein above in connection with FIG. 1. As stored, the instructions represent programmable modules that include code or data executable by a processor(s) of the computer system. The execution of such instructions configures the computer system to perform the specific operations shown in the figures and described herein. Each programmable module in combination with the processor(s) represents a means for performing a respective operation(s). While the operations are illustrated in a particular order, it should be understood that no particular order is necessary and that one or more operations may be omitted, skipped, and/or reordered.

FIG. 5 is a flowchart illustrating an example method 500 for identifying placement instructions utilizing an artificial intelligence model, in accordance with at least one embodiment. The method may be performed by a placement engine of a system. In some embodiments, the system may include a storage container configured to contain a plurality of items and a robotic device configured to place items within the storage container. In some embodiments, the robotic device may comprise one or more processors, at least one image capture device, and the placement engine (e.g., the placement engine 102 of FIG. 1) which may be configured to execute the operations of method 500.

The method 500 may begin at 502, where training data related to historical placement of one or more items within one or more storage containers may be obtained (e.g., by the model management module 408 of FIG. 4). In some embodiments, the training data may comprise one or more images associated with the placement of the one or more items within the one or more storage containers.

At 504, parameters of an artificial intelligence model may be updated (e.g., by the model management module 408) based at least in part on the training data obtained. In some embodiments, the artificial intelligence model may be configured utilizing the parameters as updated to identify placement instructions for the robotic device.

At 506, an image of an item during placement operations may be captured (e.g., or caused to be captured by the placement request manager 410 of FIG. 4). In some embodiments, the image may be captured utilizing the image capture device of the robotic device. The image may be captured as the item when the item is within a threshold distance to a goal placement location (e.g., when it is detected that the item is at or within the threshold distance to the goal placement location).

At 508, a first set of features associated with the image and a second set of features associated with the goal placement location may be provided to the artificial intelligence model. In some embodiments, the first set of features of the image may be identified utilizing another artificial intelligence model (e.g., a neural network) that is trained to identified such features. Similarly, the same or a different artificial intelligence model (e.g., another neural network) may be utilized to identify the second set of features associated with the goal placement location. The model may be previously trained to identify features associated with a goal placement location.

At 510, placement instructions for placing the item within the storage container by the robotic device may be received (e.g., by the model management module 408) from the artificial intelligence model. These placement instructions may be identified by the artificial intelligence model based at least in part on an optimization of an amount of space within the storage container. The identified placement instructions may be provided (e.g., by the output module 412 of FIG. 4) to a suitable component of the robotic device to cause the robotic device to execute the placement instructions to place the item within the storage container in accordance with the placement instructions.

FIG. 6 is a flowchart illustrating another example method 600 for identifying placement instructions utilizing an artificial intelligence model, in accordance with at least one embodiment. The operations of method 600 may be performed by a robotic device (e.g., any suitable number of the robotic devices 309 of FIG. 3).

The method 600 may begin at 602, where a placement request may be received by the robotic device (e.g., utilizing the placement request manager 410 of FIG. 4). In some embodiments, the placement request may indicate that the first object is to be placed at a goal placement location.

At 604, a first set of movement operations for bringing the first object within a threshold distance of the goal placement location may be executed by the robotic device.

At 606, an image of the first object may be captured utilizing an image capture device of the robotic device. In some embodiments, this image may be captured as the item is within the threshold distance of the placement location. In some examples, the image may indicate a second object adjacent to the placement location.

At 608, a set of movement instructions for the robotic device may be determined (e.g., by the model management module 408 and/or the output module 412 of FIG. 4) by the robotic device. The set of movement instructions may be determined based at least in part on an input to an artificial intelligence model. In some embodiments, the input may be based at least in part on the image (e.g., features of the image). The artificial intelligence model may be previously configured to at least identify a placement of the first object based at least in part on the input and a plurality of historical placement images.

At 610, the robotic device may execute the second set of movement operations corresponding to the set of movement instructions. Through execution of these operations the robotic device may place the first object within a threshold distance of the second object.

FIG. 7 is a flowchart illustrating still one further example method 700 for identifying placement instructions utilizing an artificial intelligence model, in accordance with at least one embodiment 1, in accordance with at least one embodiment. The method 700 may be performed by a robotic device (e.g., the robotic device 108 of FIG. 1).

The method 700 may begin at 702, where a placement request may be received by the robotic device (e.g., utilizing the placement request manager 410 of FIG. 4). In some embodiments, the placement request may indicate that the first object is to be placed within a placement area.

At 704, a first set of movement operations for bringing the first object within a threshold distance of the placement area may be executed by the robotic device.

At 706, an image of the first object may be captured utilizing an image capture device of the robotic device. In some embodiments, this image may be captured as the item is within the threshold distance of the placement area. In some examples, the image may indicate a second object adjacent to the placement area.

At 708, a set of movement instructions for the robotic device may be obtained (e.g., utilizing the model management module 408 and/or the output module 412 of FIG. 4) by the robotic device. The set of movement instructions may be determined based at least in part on an input to an artificial intelligence model. In some embodiments, the input may comprise features associated with the image. The artificial intelligence model may be previously configured to at least identify a placement of the first object based at least in part on the input and a plurality of historical placement images.

At 710, the robotic device may execute the second set of movement operations corresponding to the set of movement instructions obtained. Through execution of these operations the robotic device may place the first object within a threshold distance of the second object and aligned with the second object.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
    a storage container configured to contain a plurality of items; and
    a robotic device configured to place items within the storage container, the robotic device comprising:
        one or more processors;
        at least one image capture device; and
        a placement engine configured to:
            obtain training data related to historical placement of one or more items within one or more storage containers, the training data comprising one or more images associated with the historical placement of the one or more items within the one or more storage containers;
            update parameters of an artificial intelligence model based at least in part on the training data obtained, the artificial intelligence model being configured utilizing the updated parameters to identify placement instructions for the robotic device;
            capture, utilizing the image capture device of the robotic device, an image of an item during placement operations, the image being captured as the item is within a threshold distance to a goal placement location;
            provide, to the artificial intelligence model, a first set of features associated with the image and a second set of features associated with the goal placement location; and
            receive, from the artificial intelligence model, placement instructions for placing the item within the storage container by the robotic device, the placement instructions being identified by the artificial intelligence model based at least in part on an optimization of an amount of space within the storage container.

2. The inventory system of claim 1, wherein the placement engine is further configured to execute the placement instructions identified to cause the robotic device to place the item within the storage container in accordance with the placement instructions.

3. The inventory system of claim 1, wherein the placement engine is further configured to:
    incrementally capture a plurality of images of the item;
    identify corresponding placement instructions for the robotic device based at least in part on the artificial intelligence model and the plurality of images that were incrementally captured; and
    incrementally execute the corresponding placement instructions identified to bring the item incrementally closer to the goal placement location.

4. The inventory system of claim 1, wherein the artificial intelligence model is a first neural network, wherein the first set of features associated with the image are identified by the placement engine utilizing a second neural network, and the second set of features associated with the goal placement location are associated with a third neural network.

5. A computer-implemented method, comprising:
receiving, by a robotic device, a placement request indicating that a first object is to be placed at a goal placement location;
executing, by the robotic device, a first set of movement operations for bringing the first object within a threshold distance of the goal placement location;
capturing, utilizing an image capture device of the robotic device, an image of the first object within the threshold distance of the goal placement location, the image indicating a second object adjacent to the goal placement location;
determining, by the robotic device based at least in part on an input to an artificial intelligence model, a set of movement instructions for the robotic device, the input being based at least in part on the image, the artificial intelligence model being configured to at least identify a placement of the first object based at least in part on the input and a plurality of historical placement images; and
executing, by the robotic device, a second set of movement operations corresponding to the set of movement instructions to cause the robotic device to place the first object within a threshold distance of the second object.

6. The computer-implemented method of claim 5, wherein the plurality of historical placement images each comprise a portion of an object, a goal placement location for the object, and at least one other object within a threshold distance of the goal placement location.

7. The computer-implemented method of claim 6, wherein the artificial intelligence model identifies the set of movement instructions corresponding to the placement from different sets of movement instructions corresponding to different placements based at least in part on a determination that the placement results in a least amount of space between the first object and the second object.

8. The computer-implemented method of claim 5, wherein
executing the second set of movement operations causes the robotic device to align the first object with the second object.

9. The computer-implemented method of claim 5, wherein the artificial intelligence model is configured to identify movement instructions that optimize an amount of space between the first object and the second object.

10. The computer-implemented method of claim 5, further comprising updating the artificial intelligence model based at least in part on the image and the set of movement instructions.

11. The computer-implemented method of claim 10, wherein the goal placement location is situated within a storage container configured to store a plurality of objects.

12. The computer-implemented method of claim 11, wherein the image further comprises a third object adjacent to the goal placement location, and wherein executing, by the robotic device, the second set of movement operations further causes the robotic device to align the first object within threshold distances of the second object and the third object.

13. A computer-readable storage medium comprising computer-readable instructions that, upon execution by one or more processors, cause the one or more processors to perform operations comprising:

receiving, by a robotic device, a placement request indicating that a first object is to be placed within a placement area;
executing, by the robotic device, a first set of movement operations for bringing the first object within a threshold distance of the placement area;
capturing, utilizing an image capture device of the robotic device, an image of the first object within the threshold distance of the placement area, the image indicating at least a second object adjacent to the placement area;
obtaining, by the robotic device based at least in part on an input to an artificial intelligence model, a set of movement instructions for the robotic device, the input comprising features associated with the image, the artificial intelligence model being configured to at least identify a placement of the first object based at least in part on the input and a plurality of historical placement images; and
executing, by the robotic device, a second set of movement operations corresponding to the set of movement instructions to cause the robotic device to place the first object within a threshold distance of the second object and aligned with the second object.

14. The computer-readable storage medium of claim 13, wherein the plurality of historical placement images each comprise a placement object, a goal placement area within a storage area, and a plurality of previously placed objects within the storage area.

15. The computer-readable storage medium of claim 14, wherein the plurality of historical placement images are associated with corresponding movement instructions performed by a robotic device to place the placement object overlapping a portion of a corresponding placement area and aligned with at least one previously placed object.

16. The computer-readable storage medium of claim 14, wherein executing the computer-readable instructions causes the one or more processors to perform further operations comprising:
obtaining the plurality of historical placement images, the plurality of historical placement images individually comprising a placement object, a goal placement area, and a previously placed object;
identifying a set of historical placement instructions corresponding to each of the plurality of historical placement images, the set of historical placement instructions indicating movement operations performed by a robotic arm to position the placement object within a threshold distance of the goal placement area and aligned with the previously placed object; and
training the artificial intelligence model to identify subsequent movement instructions for the robotic device, the artificial intelligence model being trained based at least in part on the plurality of historical placement images, historical goal placement areas, and the historical placement instructions corresponding to the plurality of historical placement images.

17. The computer-readable storage medium of claim 14, wherein the artificial intelligence model is a neural network.

18. The computer-readable storage medium of claim 14, wherein executing the computer-readable instructions causes the one or more processors to perform further operations comprising:
capturing, utilizing the image capture device, a plurality of images corresponding to a plurality of distances from the placement area;

determining a plurality of incremental movement instructions for the robotic device utilizing the artificial intelligence model and the plurality of images; and executing the plurality of incremental movement instructions to bring the first object incrementally closer to the placement area.

19. The computer-readable storage medium of claim 18, wherein executing the computer-readable instructions causes the one or more processors to perform further operations comprising:

identifying the second object in each of the plurality of images, wherein executing the plurality of incremental movement instructions incrementally aligns the first object with the second object.

20. The computer-readable storage medium of claim 14, wherein the input further comprises features associated with the placement area, the artificial intelligence model being configured to at least identify a placement of the first object further based at least in part on the features associated with the placement area.

* * * * *